(12) United States Patent
Ficet et al.

(10) Patent No.: US 10,599,476 B2
(45) Date of Patent: Mar. 24, 2020

(54) DEVICE AND METHOD FOR ACQUIRING VALUES OF COUNTERS ASSOCIATED WITH A COMPUTATIONAL TASK

(71) Applicant: BULL SAS, Les Clayes-sous-Bois (FR)

(72) Inventors: Jean-Vincent Ficet, La Chapelle Blanche (FR); Sébastien Dugue, Saint Theoffrey (FR); Marek Schimara, Vinay (FR)

(73) Assignee: BULL SAS, Les Clayes-sous-Bois (FR)

( * ) Notice: Subject to any disclaimer, the term of this patent is extended or adjusted under 35 U.S.C. 154(b) by 19 days.

(21) Appl. No.: 16/144,061

(22) Filed: Sep. 27, 2018

(65) Prior Publication Data
US 2019/0108063 A1    Apr. 11, 2019

(30) Foreign Application Priority Data
Oct. 10, 2017    (FR) .................................... 17 59455

(51) Int. Cl.
| | |
|---|---|
| *G06F 15/16* | (2006.01) |
| *G06F 9/50* | (2006.01) |
| *H04L 12/751* | (2013.01) |
| *H04L 12/933* | (2013.01) |
| *H04L 12/24* | (2006.01) |
| *G06F 9/48* | (2006.01) |
| *H04L 12/26* | (2006.01) |

(Continued)

(52) U.S. Cl.
CPC .......... *G06F 9/5038* (2013.01); *G06F 9/4881* (2013.01); *H04L 41/0896* (2013.01); *H04L 41/142* (2013.01); *H04L 43/067* (2013.01); *H04L 45/02* (2013.01); *H04L 45/48* (2013.01); *H04L 49/15* (2013.01);

(Continued)

(58) Field of Classification Search
CPC . H04L 41/0896; H04L 41/142; H04L 43/067; H04L 45/02; H04L 45/48; H04L 49/15; H04L 43/0823; H04L 47/826; H04L 49/358; H04L 67/10; G06F 9/5038; G06F 9/4881
See application file for complete search history.

(56) References Cited

U.S. PATENT DOCUMENTS 8,443,287 B2 *  5/2013  Gooding ................. G06F 15/16
                                                                 715/736
9,253,106 B2 *  2/2016  Lu .......................... H04L 47/10
(Continued)

*Primary Examiner* — Moustafa M Meky
(74) *Attorney, Agent, or Firm* — Pearne & Gordon LLP

(57) ABSTRACT

The invention relates to a device for acquiring values of counters associated with a computational task implemented on an interconnection network, said interconnection network including a plurality of nodes interconnected via switches, said nodes and switches including a plurality of ports associated with counters, the values of said counters being stored over time, said computational task involving a subset of ports associated with subsets of nodes and switches, and said device comprising:
  a routing acquisition module, able to acquire a routing table including all the connections of the interconnection network,
  a module for acquiring involved nodes, able to acquire a list of the nodes involved in the computational task,
  a port extraction module, able to extract a list of the ports involved in the computational task from the list of involved nodes and the routing table, and
  a counter extraction module, able to extract the values of the counters of the ports involved in the computational task from the list of ports involved and the stored values of said counters.

10 Claims, 5 Drawing Sheets

Figure 1:
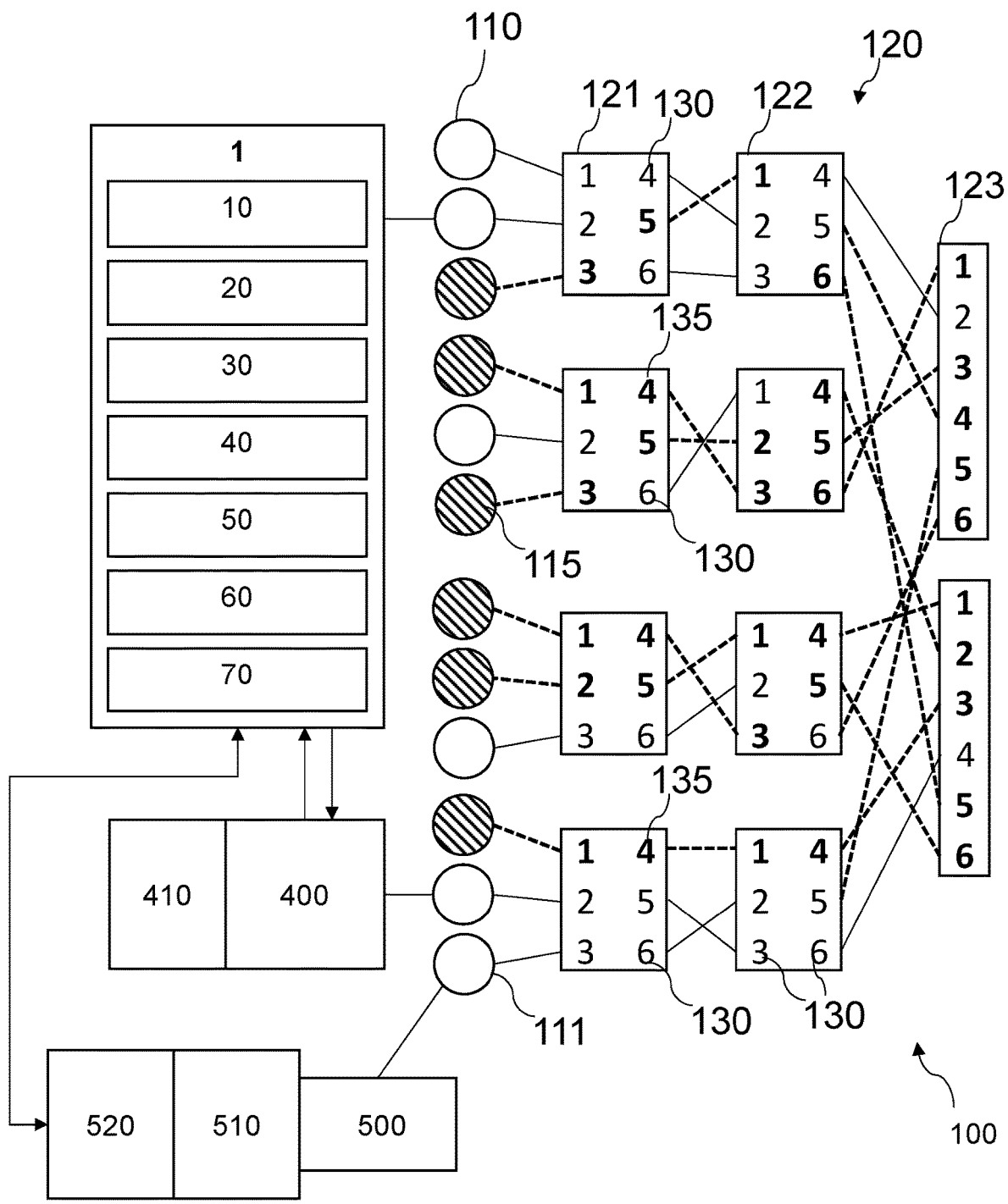

(51) Int. Cl.
  *H04L 12/753* (2013.01)
  *H04L 12/931* (2013.01)
  *H04L 12/911* (2013.01)
  *H04L 29/08* (2006.01)

(52) U.S. Cl.
  CPC ........ *H04L 43/0823* (2013.01); *H04L 47/826* (2013.01); *H04L 49/358* (2013.01); *H04L 67/10* (2013.01)

(56) References Cited

U.S. PATENT DOCUMENTS

| | | | |
|---|---|---|---|
| 9,264,332 B2* | 2/2016 | Sakurai | H04L 43/0829 |
| 9,497,111 B2* | 11/2016 | Lu | H04L 12/6418 |
| 9,602,374 B2* | 3/2017 | Mishra | H04L 43/0811 |
| 9,813,312 B2* | 11/2017 | Wu | H04L 45/14 |
| 2001/0010717 A1* | 8/2001 | Goto | H04M 15/00 379/127.01 |
| 2013/0121154 A1 | 5/2013 | Guay et al. | |
| 2013/0188519 A1* | 7/2013 | Lu | H04L 12/6418 370/254 |
| 2013/0201990 A1* | 8/2013 | Lu | H04L 12/2856 370/392 |
| 2016/0014049 A1 | 1/2016 | Zahid et al. | |
| 2016/0020973 A1* | 1/2016 | Mishra | H04L 43/0811 370/252 |
| 2016/0020993 A1* | 1/2016 | Wu | H04L 45/14 370/392 |
| 2017/0025731 A1 | 1/2017 | Kato et al. | |
| 2017/0214614 A1 | 7/2017 | Holen et al. | |

\* cited by examiner

DEVICE AND METHOD FOR ACQUIRING VALUES OF COUNTERS ASSOCIATED WITH A COMPUTATIONAL TASK

The invention relates to the field of interconnection networks, and more particularly to monitoring the performance of an interconnection network when performing a computational task. The invention provides a device for acquiring values of counters associated with a computational task implemented on an interconnection network, a method for acquiring values that can be implemented by such a device, as well as a method for planning a computational task implemented by such a device.

PRIOR ART

High Performance Computing, also known as HPC (High Performance Computing in Anglo-Saxon terminology), is developing for both academic research and industry, especially in technical fields such as aeronautics, energy, climatology and life sciences. These calculations are generally implemented by clusters. The purpose of these clusters is to overcome the limitations of existing hardware by pooling resources to allow parallelized execution of instructions and disk and memory aggregation.

A cluster is a set of computing means (also called nodes) interconnected by an interconnection network that can perform common operations. Clusters consist of a large number of nodes (typically several thousand), the latter being interconnected, for example hierarchically, by switches (typically several hundred), called switch in Anglo-Saxon terminology. The networks thus formed may comprise several tens of thousands of ports. Each node is for example a server, a computer or more generally a machine.

In addition, each of these ports may have more than one hundred counters (e.g. 186), the purpose of which is to track numerous characteristics of the port such as performance or errors, especially during a computational task. For example, according to document US2017/025731, monitoring and controlling a cluster, particularly switches, are typically performed centrally via a dedicated node, called the administration node. A network manager (also called a "Subnet Manager") can monitor the network via this administration node (see "Infiniband™ Architecture Volume 1 Release 1.3"). This monitoring particularly includes monitoring the operation state of the cluster components to alert, where appropriate, an administrator of a potential hardware problem. Thus, since an interconnection network may include several hundred switches (e.g. 500) resulting in the presence of several thousand ports (e.g. 30,000), the number of counter to be monitored at the level of the network manager is extremely high. In addition, other monitoring systems have been implemented such as described in document US2016/0014049 comprising several managers and especially subnet managers operating in standby mode, in which one of the subnet managers can take over in case of a failure of the first subnet manager. There are also, as described in document US2017/0214614, methods capable of sending through the subnet manager a query packet in order to obtain connectivity information and the query packet of which can be modified. In addition, document US2013/0121154 describes a method for improving the network performance by preventing congestion through a performance manager and a subnet manager that can alert a host to improve the network performance.

Thus, the current tools allow to store, within a database, the values of the various counters of all the ports of an interconnection network or a computational islet. Thus, a user can individually consult the values of each of these counters and display the variations as a function of time. Nevertheless, it is not possible, with the current tools, to easily identify equipment failures of the interconnection network as part of a specific computational task. Indeed, in parallel, an interconnection network can allow several tens of computational tasks to be performed. In addition, a computational task will usually require the intervention of several tens or hundreds of nodes and therefore the involvement of several hundreds or thousands of ports when all the switches involved in the task are taken into consideration.

When a user has a computational task longer than expected or faces reproducibility issues, it may be necessary to identify the cause. Usually, such a user does not have the possibility to make these checks quickly. Indeed, presently, a user can identify the nodes involved in a computational task he/she has just conducted and individually track the counters of these nodes. The values of the counters must, for example, be scanned manually by selecting, on the one hand, the port, and, on the other hand, the counter to be studied. Thus, it is not possible today to quickly perform an analysis of the performance of an interconnection network during a computational task given the counters of the ports involved in said task. Indeed, the resource manager has access to the counter data, but cannot make a selection in relation to the computational task.

Thus, there is a need for new devices and methods for tracking the performance of an interconnection network when implementing a computational task so as to quickly identify errors that may impact the computational task.

TECHNICAL PROBLEM

The invention therefore aims to overcome the disadvantages of the prior art. In particular, the object of the invention is to provide a device for acquiring values of counters associated with a computational task, said device allowing to quickly access failure indicators of the equipment specifically involved in the monitored computational task.

The invention also aims to provide a method for acquiring values of counters associated with a computational task, said method being quick and easy to implement and allowing a user, as part of the epilogue of a computational task, to easily navigate within relevant performance indicators for a specific computational task and to quickly visualize possible malfunctions in an interconnection network subset used for this computational task. Such a method allows to reduce the time spent searching for a possible problem in the equipment associated with this computational task, taking into account both the nodes and the switches involved in the computational task.

BRIEF DESCRIPTION OF THE INVENTION

To this end, the invention relates to a device for acquiring values of counters associated with a computational task implemented on an interconnection network, said interconnection network including a plurality of nodes interconnected via switches, said nodes and switches including a plurality of ports associated with counters, the values of said counters being stored over time, said computational task involving a subset of ports associated with subsets of nodes and switches, and said device comprising:
- a routing acquisition module, able to acquire a routing table including all the connections of the interconnection network, a module for acquiring involved nodes, able to acquire a list of the nodes involved in the computational task, a port extraction module, able to extract a list of the ports involved in the computational task from the list of involved nodes and the routing table, and a counter extraction module, able to extract the values of the counters of the ports involved in the computational task from the list of ports involved and the stored values of said counters.

This invention allows, in particular, by a succession of data acquisition and extraction steps, to generate a set of data relating to the equipment involved in a computational task. In particular, this invention allows to generate a list of the ports involved in a computational task by correlating the list of the nodes involved in a computational task with the routing used by the interconnection network. This allows to determine the complete list of ports nodes, and switches to be included in order to obtain the values of all the counters that can explain a possible malfunction during a computational task, without being limited to the ends of the network involved (namely nodes).

Thus, such a device communicates with several databases, or information sources, so as to generate a new data set restricted to the data that may be of interest to a user as part of a specific computational task. The user will gain many hours of failure search compared to a search conducted in a data list that is either too large (namely all the ports of the interconnection network) or fragmented (namely all the ports of the nodes involved in the computational task).

This device also allows, when implemented, to organize and filter large volumes of data leading to the extraction of essentially relevant values that can then be stored in one or more files (e.g. databases).

According to other optional features of the device:

the computational task includes a start date and an end date, and the counter extraction module is able to compare counter values at the start date and at the end date of the task, and to select counters, the value of which has increased between the beginning and the end of the computational task. Thus, this consists in evaluating the difference between the value of the counter at the end of the task and the value of the counter at the beginning of the task. If the difference is zero or not significant, then the counter values are not extracted. That is to say, a counter, the value of which remains constant over time, will not be selected or extracted. This allows to gain in processing speed. Indeed, since the volume of data is smaller, their processing is faster, the volume of data storage required is smaller and this also constitutes a gain of time for the user who does not have to browse data without interest (namely constant values).

It also includes a report generation module able to generate at least one performance analysis report from the values of the counters of the ports involved in the computational task, said report advantageously comprising performance indicators of the interconnection network for said computational task. Thus, a user will be able to access a report including information on the equipment that has potentially slowed or disturbed the computational task.

The report generation module is able to receive an instruction, said instruction including the designation of one or more counter categories and said report generation module is then able to generate a performance analysis report including a list of ports involved and the values of the one or more counters designated for those ports.

In this case, the device can generate targeted information from an instruction including the identification of a specific counter.

The report generation module is able to receive an instruction, said instruction including the designation of one or more levels of the interconnection network and said report generation module is then able to generate a performance analysis report regarding said one or more levels of the interconnection network, preferably a single level. Thus, as shown in the following description, the device is able to quickly allow identification of the possible disturbance zone in the interconnection network.

The report generation module includes means for aggregating the involved counter values, said report generation module is then able to generate a performance analysis report including aggregated values of the counters involved.

It further comprises a storage module able to store routing tables, lists of nodes involved in a computational task, lists of ports involved in a computational task, performance analysis reports and/or the values of the counters of the ports involved in a computational task, preferably in the form of a round-robin-type base.

The routing acquisition module is able to perform a scan of the interconnection network so as to collect the routing tables, preferably in real time. Advantageously, the routing tables are acquired from a memory able to store routing information such as routing tables.

The invention further relates to a method for acquiring, by a device, values of counters associated with a computational task controlled by a client and implemented on an interconnection network, said interconnection network including a plurality of nodes interconnected via switches, said nodes and switches including a plurality of ports associated with counters, the values of said counters being stored over time, said computational task involving a subset of ports associated with subsets of nodes and switches, and said method comprising the following steps:

Acquiring, by a routing acquisition module, a routing table including all the connections of the interconnection network, Acquiring, by a module for acquiring involved nodes, a list of the nodes involved in the computational task, said list of nodes involved being stored on the client, Extracting, by a port extraction module, a list of the ports involved in the computational task from the list of involved nodes and the routing table, Extracting, by a counter extraction module, the values of the counters of the ports involved in the computational task from the list of ports involved and the stored values of said counters.

Such a method allows to generate a set of counter values of the ports involved in a computational task and therefore to be able to quickly process or visualize these values so as to identify possible malfunctions in equipment of the subset of the interconnection network that has been involved in the computational task.

The invention further relates to a device for planning, by a client, a computational task implemented on an interconnection network, said interconnection network including a plurality of nodes interconnected via switches, said nodes and switches including a plurality of ports associated with counters, the values of said counters being stored over time, said computational task involving a subset of ports associated with subsets of nodes and switches, and said method comprising the following steps:

Receiving, for example by the client, an instruction for setting up a computational task, said computational task including a list of resources required to implement it, Identifying a subset of nodes corresponding to the list of resources required to implement the computational task, Initiating the computational task on the subset of identified nodes, Receiving, for example by the client, the completed computational task report, Sending an instruction to a device for acquiring values according to the invention, and Receiving one or more performance analysis reports from the values of the counters of the ports involved in the computational task.

This allows, as part of the planning of a computational task, by a user, to directly receive a targeted performance analysis report, for example at the epilogue of the planning of said computational task. This targeted performance analysis report specifically concerns the equipment, and more particularly the ports involved in the computational task.

Figure 2:
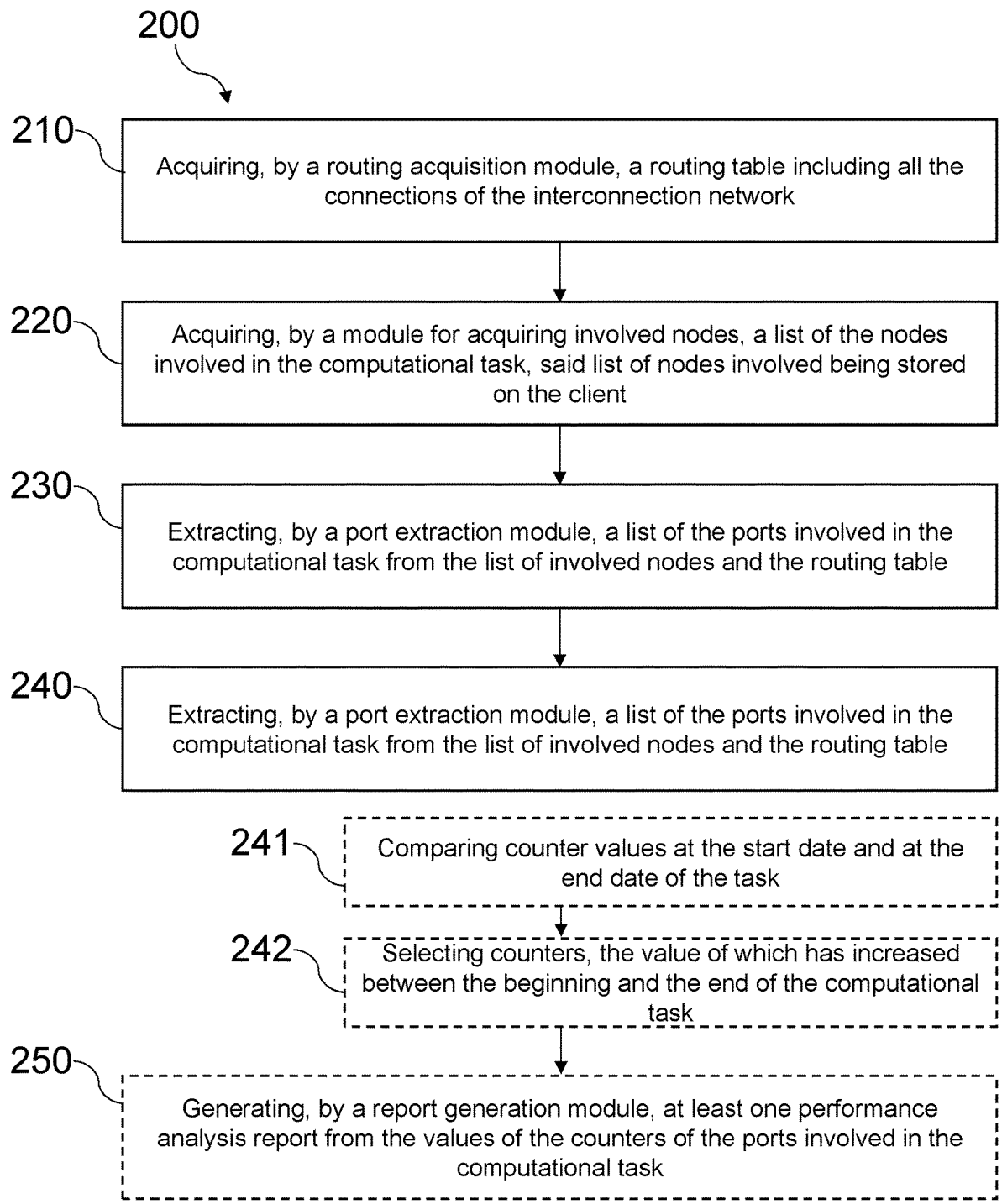
Figure 3A:
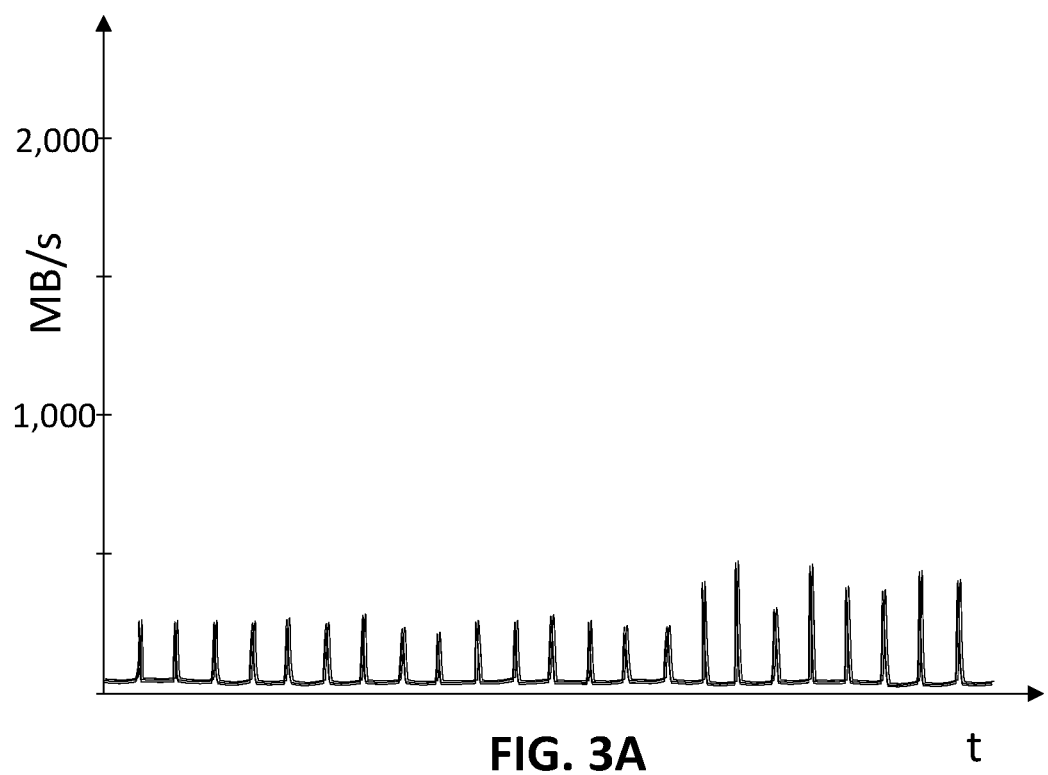
Figure 3B:
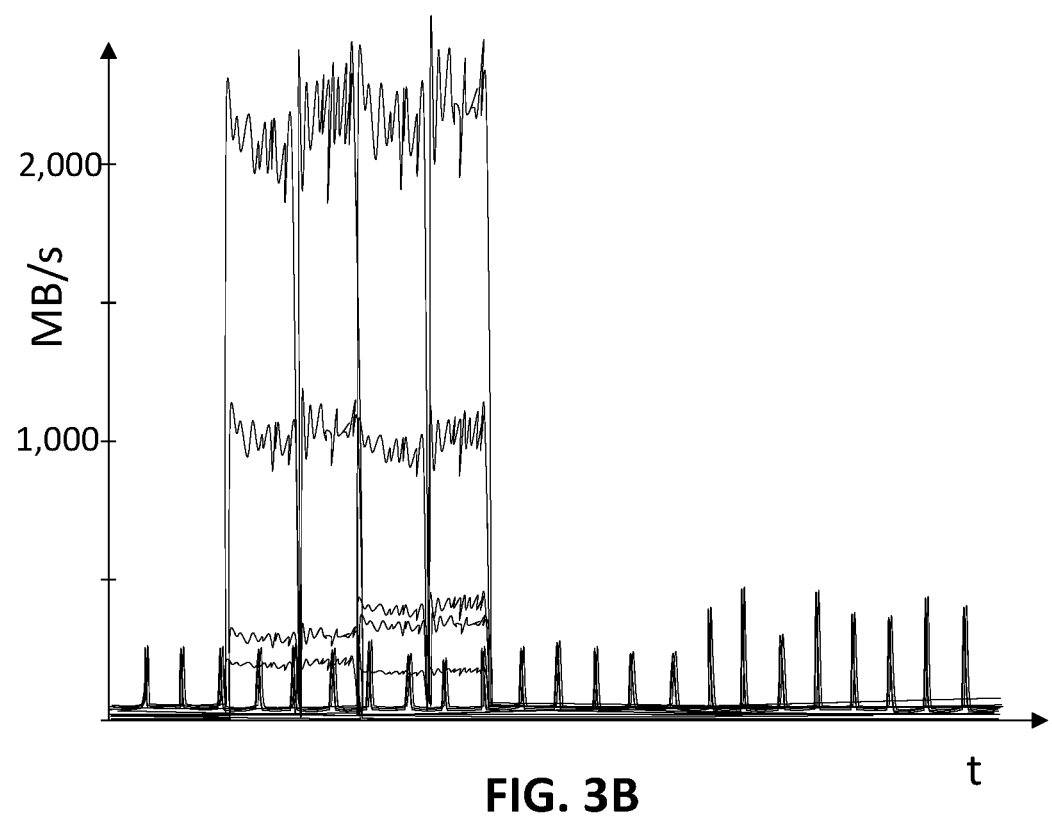
Figure 3C:
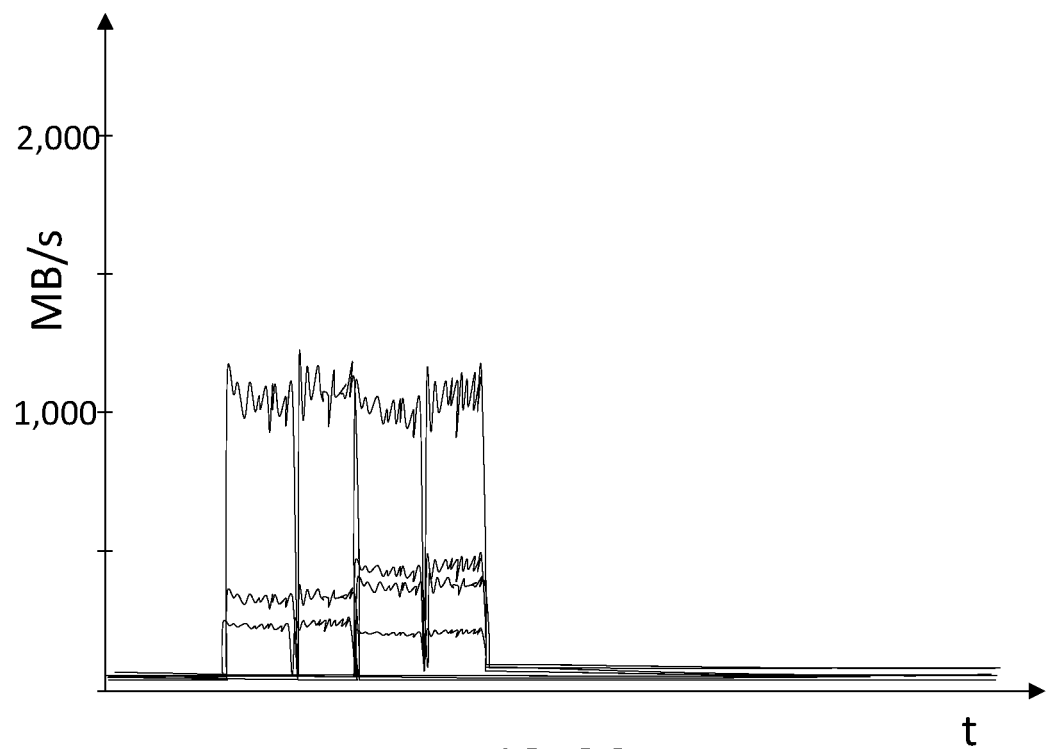
Figure 3D:
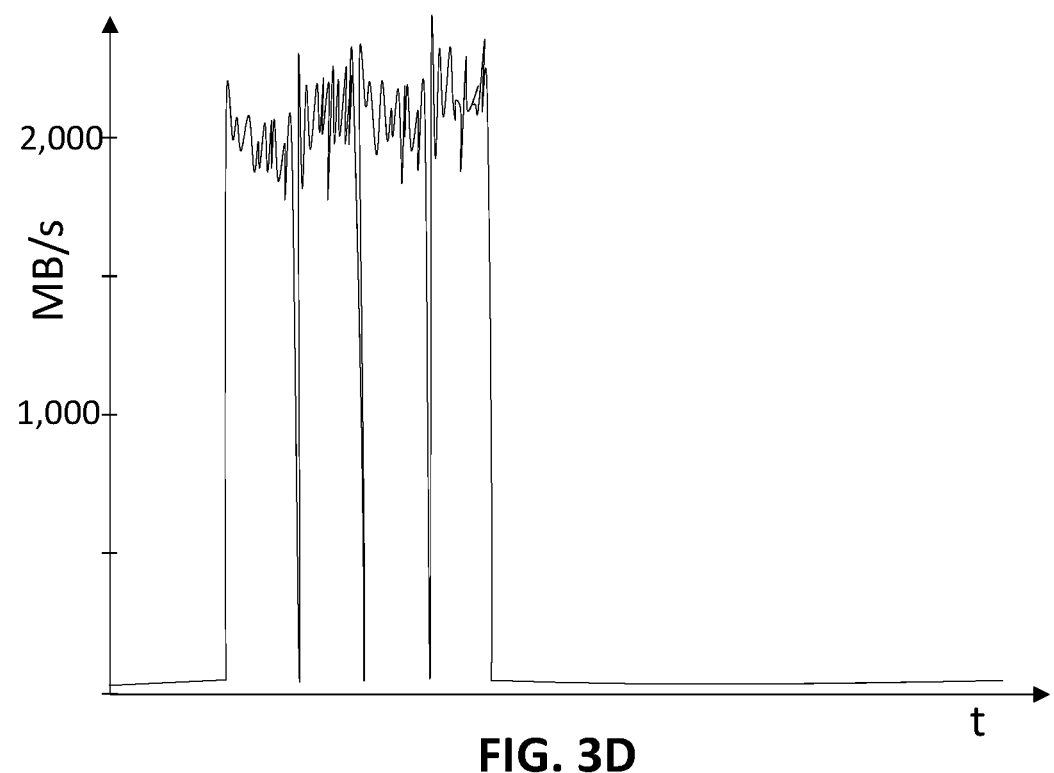

Other advantages and characteristics of the invention will appear upon reading the following description given by way of illustrative and non-limiting example, with reference to the appended figures which represent:

FIG. 1, an example of the topology of a cluster associated with a device for acquiring counter values according to the invention;

FIG. 2, a schematic representation of a method for acquiring counter values according to the invention;

FIGS. 3A to 3D, graphical representations of the values of counters associated with a computational task as a function of time. The counters shown being representative of the data transmitted by the ports considered, namely the ports of the computational nodes (FIG. 3A), the ports of the set of the nodes and switches involved in the computational task (FIG. 3B), the ports of the first level switches (FIG. 3C) and the ports of the second level switches (FIG. 3D).

Figure 4:
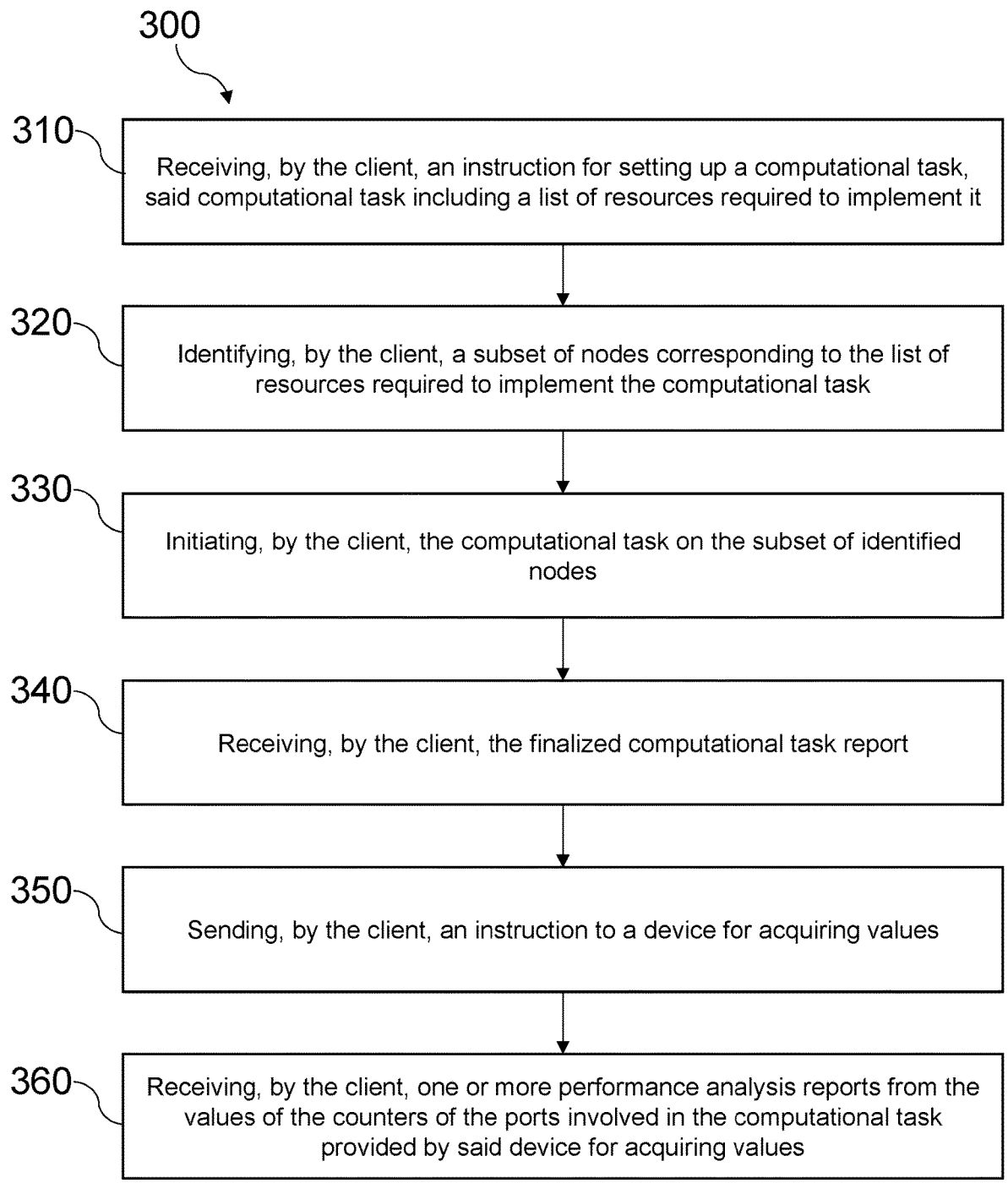

FIG. 4, a schematic representation of a method for planning a computational task according to the invention.

DESCRIPTION OF THE INVENTION

In the following description, by "interconnection network" is meant any dedicated computing network (such as an InfiniBand network—InfiniBand is a trademark), or more generally any collection of computer elements, especially distributed processors, with physical communication links between them. An interconnection network is generally, within the meaning of the invention, a set of interconnected computing means (also called nodes) that can perform common operations. Clusters typically consist of thousands of nodes interconnected by hundreds of switches. The networks thus formed may comprise several tens of thousands of ports. These ports are associated with counters for example for tracking the performance of the piece of equipment.

By "counters" is meant herein a means for tracking the packets or data and the errors that occur on a port or an interface of a switch or a node. Thus, the counters are more particularly performance counters associated with ports, and are generally used to monitor the transmitted data, the transport characteristics and the errors generated by the piece of equipment. For example, counters can track the volume of the data transmitted, the number of times a collision occurred before the interface successfully transmitted a data, the number of packets ignored, the number of packets received and rejected because there was no buffer space, etc. These counters thus allow to produce data relating to the traffic on the subset of the interconnection network considered. These counters are usually incremental counters that do not need to be reset between each computational task.

By "computational task" is meant, within the meaning of the invention, a set of calculations which may for example be decomposed into a repetition of an elementary calculation on data having the same structure or a succession of different calculations where calculations are applied to the results of previous calculations. A computational task in the context of the invention can refer for example to a molecular modeling, to weather forecasting, to complex mathematical operations such as Monte Carlo analysis simulations for the analysis of financial risks, to computer-assisted designs or millions of parallel parametric scans for optimizing conditions.

Furthermore, by "interconnection topology" is meant, within the meaning of the invention, the architecture defining the entirety of the links, the connections (or interconnections) between all the service nodes of an interconnection network. It can be a non-oriented graph where vertices represent, for example, switches and nodes, and arcs represent links (or cables). It should be noted that there are several topologies such as those called hierarchical ones, ring ones or mesh ones. Among these topologies, the ones called "Fat-tree", "Generalized Fat Tree", "Hypercube", "Generalized Hypercube", 2D/3D Torus, and Mesh, may be cited in particular, some of these terms are also trademarks.

Within the meaning of the invention, a "routing table" is a set of data, for example rules, allowing to determine where the data traveling on an interconnection network will be routed. This set of rules can be stored in one or more routing tables, for example in the form of one or more files. A routing table allows to store the topology of the interconnection network. The routing table can be used in the context of a deterministic and/or adaptive routing. During a deterministic routing, routing is based on the destination, which means that when a packet is in a node or a switch, the rest of the path to be traveled will be determined by its destination. For example, a routing table may take the form of a relational database consisting of data elements with a predefined relationship between them. For example, these elements can be organized into tables consisting of columns and rows for listing the information on the routes between different nodes represented in the database. Preferably, the routing table is a distributed static routing table.

By "aggregation" is meant the implementation of one or more mathematical operations allowing for example to generate a reduced subset of values from a larger set of values. For example, an aggregation may correspond to the selection of the ten highest or lowest counter values among the counter values of the ports involved. An aggregation, within the meaning of the invention, may also include the generation of a transformed value such as: a progression value (via a subtraction of the value at the end of the computational task from the value at the beginning of the computational task), a value in time (the division of the data volume values exchanged by the time in order to obtain throughput values), an average value, a median value or a variance value. Aggregation can also allow to select a low extreme value of a counter, for example via calculation of a percentile lower than or equal to ten, while a high counter extreme value may for example be selected from the percentiles higher than or equal to 90. This can be useful for example in order to identify very high or otherwise very low throughputs. The aggregation may also consists in selecting the highest or lowest values for given categories of counters.

By "configuration file", within the meaning of the invention, is meant a file comprising the information required in particular for implementing the method according to the invention. The files are accessible to the various modules of the device according to the invention.

By "process", "compute", "determine", "display", "compare" or more broadly "executable operation", within the meaning of the invention, are meant an action performed by a device or a processor unless the context indicates otherwise. In this regard, the operations relate to actions and/or processes of a data processing system, for example a computer system or an electronic computing device, which manipulates and transforms the data represented as physical (electronic) quantities in the memories of the computer system or other devices for storing, transmitting or displaying information. These operations may be based on applications or softwares.

The terms or expressions "application", "software", "program code", and "executable code" mean any expression, code or notation, of a set of instructions intended to cause a data processing to perform a particular function directly or indirectly (e.g. after a conversion operation to another code). Program code examples may include, but are not limited to, a subprogram, a function, an executable application, a source code, an object code, a library and/or any other sequence of instructions designed for being performed on a computer system.

By "processor", within the meaning of the invention, is meant at least one hardware circuit configured to perform operations according to instructions contained in a code. The hardware circuit may be an integrated circuit. Examples of a processor include, but are not limited to, a central processing unit, a graphics processor, an application-specific integrated circuit (ASIC), and a programmable logic circuit.

By "coupled", within the meaning of the invention, is meant connected, directly or indirectly, with one or more intermediate elements. Two elements may be coupled mechanically, electrically or linked by a communication channel.

The expression "human-machine interface", within the meaning of the invention, corresponds to any element allowing a human being to communicate with a computer, in particular and without being exhaustive, a keyboard and means allowing in response to the commands entered on the keyboard to perform displays and optionally to select with the mouse or a touchpad items displayed on the screen.

The term "malfunction", within the meaning of the invention, corresponds to the occurrence of a hardware incident or congestion on the interconnection network.

By "client", within the meaning of the present invention, is meant any hardware and/or software capable of accessing the device for acquiring counter values.

In the following description, the same references are used to designate the same elements.

Generally, in the context of the setting up an interconnection network, when initializing, a network manager 500 initiates a discovery phase where it performs, via an administration node 111, a scan of the interconnection network in order to discover all the switches 120 and the nodes 110. Then, it proceeds to the assignment of identifier for example of the LID- or GID-type, the configuration of the switches 120, the calculations of a routing table and the configuration of the ports 130. At this point, an interconnection network 100 is ready for use. Once the network is configured, the network manager 500 can monitor any changes on the interconnection network 100 (e.g. a device is added or a link is deleted). The network manager 500 can also be coupled to a memory 510 able to store routing information such as routing tables.

In the example illustrated in FIG. 1, the interconnection network 100 comprises here a set of referenced nodes 110, including an administration node 111, as well as a set of referenced switches 120. Each switch has here six bidirectional ports 130 numbered 1 to 6. The nodes 110 are connected to first level switches 121 which are themselves connected to second level switches 122 which are in turn connected to two third level switches 123. The switches 120, that is to say 121, 122 and 123, route messages from their sources to their destinations, especially according to rules written in routing tables. The switches 121 are each connected to three different nodes 110. Each node 110 is here connected to each one of the other nodes 110 via at most five switches 120.

According to one aspect, the invention relates to a device 1 for acquiring values of counters associated with a computational task implemented on an interconnection network 100. The interconnection network 100 generally includes a plurality of nodes 110 interconnected via switches 120, said nodes and switches including a plurality of ports 130 associated with counters. On such a network, counter values are usually stored over time. This storage over time may for example be a continuous storage (e.g. every 30 seconds or less, preferably every 10 seconds or less) of the value of each port counter of each piece of equipment concerned. This can represent nearly two hundred counters to be periodically stored per port. This storage can be done in one or more files in different formats such as: OpenTSDB, InfluxDB, collectd, or csv. This storage can be performed by an agent located on the nodes 110, switches 120 and/or by a network manager 500. For example, the values of the counters can be stored over time in a memory 520 able to store counter values, said memory 520 preferably being a round-robin-type base.

The computational task generally involves a subset of ports associated with subsets of nodes and switches. Indeed, an interconnection network 100 is able to implement in parallel several tens or hundreds of computational tasks. Thus, a computational task does not involve all the ports 130 of an interconnection network, but only a subset of nodes and a subset of ports. A subset of nodes may also be called involved nodes 115 (namely involved in the computational task) while a subset of ports may also be called involved ports 135. To illustrate this, in FIG. 1, the ports 135 involved in a computational task are reported in "bold" formatting while the involved nodes 115 are hatched.

As shown in FIG. 1, the acquisition device 1 according to the invention comprises a routing acquisition module 10. This module is able to acquire a routing table including all the connections of the interconnection network 100.

The routing table can for example be obtained via the network manager 500 or nodes 110 and switches 120. Indeed, at startup or when modifying the topology of the network, the network manager 500 generally performs a discovery of the topology, the calculation of a correspondence table for each of the switches 120, and a transmission thereof to the switches 120.

Preferably, the routing acquisition module 10 is able to acquire the routing table including the data on all the connections of the interconnection network from a memory 510 able to store routing information such as routing tables. Advantageously, the acquisition is performed in real time. That is to say, the discovery is performed periodically over time, for example continuously (e.g. every 30 seconds or less, preferably every 10 seconds or less). The routing acquisition module 10 may also be able to perform an exploration of the interconnection network 100 before, during and/or after implementing the computational task. Alternatively, the routing acquisition module 10 is able to perform an exploration of the interconnection network 100 so as to identify all the switches of the interconnection network. The routing acquisition module 10 is then able to download the routing tables from the switches of the interconnection network. Thus, the device according to the invention could generate the set of values of counters involved without dependencies to the managers or applications installed on the interconnection network. This provides greater flexibility to the device.

The routing table can be saved in one or more files and for example in the form of a relational database including information relating to all the equipment with all the ports and all the connections between the ports. The routing table may for example be stored at regular intervals, for example once a day, preferably at least once every hour, more preferably at least twice every hour. Thus, advantageously, the routing acquisition module 10 is able to store a history of the topology of the interconnection network 100.

In addition, the routing module 10 can be configured to perform a step of analyzing the routing tables so as to identify, during the duration of the computational task, a possible modification of the routing table such as a rerouting. The routing module 10 is able to generate an alert in the case of such a modification of the routing table.

As shown in FIG. 1, the acquisition device 1 according to the invention comprises a module 20 for acquiring involved nodes. This module is able to acquire a list of the nodes 115 involved in the computational task.

FIG. 1 illustrates a client 400. The acquisition device 1 can access the client 400 same as the latter can access the acquisition device 1. For example, the acquisition device 1 can access the client 400 so as to extract the list of nodes 115 involved in the computational task. Such a list of the involved nodes 115 may for example be stored in a memory 410.

Indeed, the client 400 may allow the implementation of at least one task and resource manager, for example selected from: LSF, PBSpro, Moab, Slurm, or Torque/Maui. These resource managers are capable of managing the implementation of a computational task on an interconnection network. More specifically, the resource manager is able to assign a unique identifier to a computational task, specify the parameters required to perform the computational task, optionally specify the nodes to be assigned to the computational task and memorize the nodes being used by the computational task. Thus, a resource manager is able to receive the user computational task submissions and manage their implementation in time and space on the cluster. The resource managers thus allow the scheduling of the computational tasks. More particularly, in the task allocation process, the resource manager assigns not only the computational node for executing the job, but also the period of time during which the job can use the computational node.

Thus, the client 400 advantageously includes data allowing to identify the nodes used by a given computational task. Indeed, a computational task uses a subset of nodes and switches of the interconnection network 100. This subset is allocated by a resource manager that can be hosted on the client 400. In order to analyze the performance of an interconnection network as part of a specific computational task, it is advantageous to be able to analyze the port counters used by the latter and only these counters. Thus, the acquisition of the involved nodes 115 may for example be performed via a resource manager.

Preferably, the module 20 for acquiring involved nodes is able to generate an instruction including a unique identifier of the computational task, send it to a client 400 and receive in response a list of the nodes 115 involved in the computational task.

Advantageously, in addition to the list of nodes 115 involved in the computational task, the module 20 for acquiring involved nodes is able to receive the start date and the end date of the computational task.

As shown in FIG. 1, the acquisition device 1 according to the invention comprises a port extraction module 30. This module is able to extract a list of the ports 135 involved in the computational task from a list of involved nodes 115 and a routing table. The list of the ports involved 135 advantageously includes the ports of the nodes 115 involved in the computational task, as well as the ports of the switches involved.

Advantageously, a list of the ports 135 involved in the computational task only includes the ports 135 involved in the computational task. Thus, unlike devices or methods of the prior art, the ports that are not involved in performing the computational task are not taken into consideration. This allows to drastically reduce the volume of data to be processed and therefore to significantly improve the implementation speed of the invention. In addition, it allows to consider only the counter values relating to the ports involved in the computational task. That is to say that the list of extracted values will not include any counter values for ports which are not involved in the computational task.

As shown in FIG. 1, the acquisition device 1 according to the invention comprises a counter extraction module 40. This module is able to extract the values of the counters of the ports involved in the computational task from the list of ports involved 135 and the stored values of said counters.

Preferably, the counters considered in the context of the invention are performance counters associated with the ports and are generally used to monitor the data transmitted, the transport characteristics and the errors generated by the piece of equipment. The counters advantageously track the volume of the data transmitted or received, the number of packets received or sent, the errors such as the number of times a collision occurred before the interface successfully transmitted a data or the number of packets ignored and/or the number of packets received and rejected because there was no buffer space.

The counter extraction module 40 is further able to acquire in advance the stored values of said counters. The stored values of the port counters may for example be stored at the switches or the nodes. These values therefore correspond to all the counter values of all the ports of the entire interconnection network. In this case, the counter extraction module 40 is able to acquire the values at the switches 120 and the nodes 110. The values of the port counters of the entire interconnection network may also be stored, for example by a network manager 500, in one or more files 520 dedicated to the values of the counters of the ports involved 135. These data can be stored in different formats such as: OpenTSDB, InfluxDB, collectd, or csv. In this case, the counter extraction module 40 is able to acquire the values at the level of one or more files, preferably several files, for saving the values of the port counters.

A computational task includes a start date and an end date. Therefore, advantageously, the counter extraction module is able to compare counter values at the start date and at the end date of the task, and to extract counters, the value of which has increased between the beginning and the end of the computational task.

More particularly, if the difference is zero or not significant, then the counter is not extracted. Thus, a counter, the value of which remains constant over time, will not be extracted. By not significant must be understood that the difference is less than a predetermined threshold. For example, an error counter will not be selected/extracted if the difference is less than a predetermined threshold. The predetermined thresholds can be set during a configuration step of the device 1 according to the invention and stored in a configuration file.

In addition, the counter extraction module 40 is able to subtract, for each counter, its value at the start date from its value at the end date so as to obtain the progression of the counter value during the computational task.

Advantageously, the acquisition device 1 is able to store, on one or more files, the counter values of the ports 135 involved in the computational task. Thus, the device can access or allow access to the different metrics for each involved port 135 of the interconnection network 100. These data may for example be stored in the form of an RRD database (Round-Robin database in Anglo-Saxon terminology). Such a base advantageously has a fixed size.

The device 1 may comprise a storage module 60 able to store the values of the counters of the ports 135 involved in the computational task, preferably in the form of a round-robin-type base. The storage module 60 may also be able to store the topology of the interconnection network 100.

As shown in FIG. 1, the acquisition device 1 according to the invention may also comprise a report generation module 50. This module is able to generate at least one performance analysis report from the values of the counters of the ports involved in the computational task.

This performance analysis report allows to evaluate the performance of the interconnection network 100 during a computational task.

The report generation module 50 may for example be configured to receive an instruction including the designation of one or more categories of counters. In this case, the report generation module 50 is then able to generate a performance analysis report including a list of ports involved 135 and the values of the one or more counters designated for these ports involved 135. The report generation module 50 may also be able to receive an instruction including the designation of one or more levels of the interconnection network. In this case, the report generation module is then able to generate a performance analysis report on, or limited to, one or more levels of the interconnection network 100. The instructions may for example be transmitted from a human-machine interface (HMI). More generally, the device 1 is able to receive, for example via an HMI interface, computational task identifiers, counter identifiers and/or the levels of the interconnection network so as to generate the appropriate reports.

The report generation module 50 may be able to aggregate the values of counters involved. The report generation module is then able to generate a performance analysis report including aggregate values of the counters involved.

The performance analysis report can advantageously take a shape selected from: one or more lists of values associated with ports for example in the form of a table, links to values of counters associated with ports, one or more graphs representing the evolution of said counters during said computational task.

In addition, as shown in FIG. 1, the acquisition device 1 may include a communication module 70 able to transmit an instruction identifying a computational task. The communication module 70 is configured to receive and transmit information to remote systems such as tablets, phones, computers or servers and can thus enable the communication between the device 1 and a remote terminal, including a client 400. The communication module 70 allows to transmit the data on at least one communication network and may comprise a wired or wireless communication. The interaction may involve an application software used by the operator to interact with the device according to the invention. The application software may include a graphical interface for facilitating an interaction with an operator. An operator can then act on the remote terminal so as to generate an instruction that can be implemented by the device 1.

In the example shown in FIG. 1, a client 400 accesses the acquisition device 1. For example, the client 400 may execute a client application that is configured to communicate with the acquisition device 1. The client application may be a browser or another client-based communication application. In response to the access by the client 400, the acquisition device 1 can generate a user interface that can be sent to the client 400.

As has just been shown, the acquisition device 1 according to the invention includes a plurality of modules. These modules 10, 20, 30, 40, 50, 60, 70 are separate in FIG. 1, but the invention may provide various types of arrangement, for example a single module cumulating all the functions described here. Similarly, these means may be divided into several electronic boards or gathered on a single electronic board. Similarly, when an action is taken to a device or a module, it is actually performed by a microprocessor of the device or module controlled by instruction codes stored in a memory. If an action is taken to an application, it is actually performed by a microprocessor of the device in a memory of which the instruction codes corresponding to the application are stored. When a device or module transmits or receives a message, this message is sent or received by a communication interface. The memories mentioned in this invention may correspond to a random access memory and/or a mass memory. The mass memory may be a medium such as a memory card, or a hard disk hosted by a remote server.

According to another aspect, the invention relates to a method 200 for acquiring values of counters associated with a computational task according to the invention. The computational task is generally controlled by a client 400 and implemented on an interconnection network 100. This method is implemented by a device and preferably by an acquisition device 1 according to the invention.

As shown in FIG. 2, the method includes an acquisition step 210, by a routing acquisition module, of a routing table including all the connections of the interconnection network, an acquisition step 220, by a module for acquiring involved nodes, of a list of the nodes involved in the computational task, said list of involved nodes being stored on the client, an extraction step 230, by a port extraction module, of a list of the ports involved in the computational task from the list of involved nodes and the routing table, and an extraction step 240, by a counter extraction module, of the values of the counters of the ports involved in the computational task from the list of ports involved and the stored values of said counters.

Thus, a user can extract the values of the counters of the ports involved in the computational task from, for example, an instruction including a unique identifier of the computational task.

During the extraction step 240 of the values of the counters of the ports involved in the computational task, the method may advantageously comprise the following substeps:

- comparing 241 counter values at the start date and at the end date of the task, and
- selecting 242 counters, the value of which has increased between the beginning and the end of the computational task.

In addition, the method may comprise a generation step 250, by a report generation module, of at least one performance analysis report from the values of the counters of the ports involved in the computational task.

In addition, advantageously, the method according to the invention may include an instruction generating step for a graphical representation of the values of the counters of the port involved in the computational task. These graphs can show the main counters that have evolved during the computational task. Preferably, at least one graph is automatically generated at the end of each of the computational tasks. Even more preferably, the method includes the selection, with the computational task, of one or more counters which will be the subject of the graph generation.

FIG. 3 show the tracking of the values of the "transmitted data" counter as a function of time. These figures, from FIG. 3B to FIG. 3D, illustrate the implementation of the invention and its use as part of the generation of performance analysis reports. These performance analysis reports may be represented in the form of graphs to identify a source of a slowdown in a computational task.

FIG. 3A shows an example of a graph that can be generated conventionally when the user manually selects all the ports of the nodes involved in his/her computational task. The study of FIG. 3A shows that the computational task required on the nodes involved a bandwidth of the order of 300 MB/s. However, this value is far from the saturation of the equipment, said saturation being able to occur for example when the bandwidth used is greater than 1,500 MB/s.

In the context of the invention, the user implements the device according to the invention to generate a second graph shown in FIG. 3B. The graph of FIG. 3B includes the bandwidth values as a function of time of all the ports involved in the computational task. Thus, this includes the ports of the nodes involved in the computational task, but also the ports involved in the computational task of the switches of the interconnection network. The study of FIG. 3B shows that the computational task required on some ports a bandwidth of the order of 1,000 MB/s, normally non-saturated, but also on other ports a bandwidth greater than 2,000 MB/s and therefore likely to generate the saturation of the equipment.

Still within the scope of the invention, the user can advantageously specify to the device that he/she wishes to limit the report generation to the ports located on the first level of the interconnection network. The performance analysis report is then graphically represented as shown in FIG. 3C. The study of FIG. 3C shows that the computational task did not require on the involved ports of the first level of the network a bandwidth greater than 1,500 MB/s.

The same analysis carried out on the ports of the second level of the interconnection network and shown in FIG. 3D shows on the contrary that these ports have a bandwidth greater than 2,000 MB/s and were therefore likely to generate the saturation of the equipment.

In this context, for example according to an instruction transmitted by the client of the user, the device according to the invention can aggregate the counter values so as to generate information directly interpretable by the user such as the Table 1 below.

TABLE 1

Top 5 values of the counters of data transmitted

| Position | port ID | Counter value |
|---|---|---|
| 1 | /switch/mib101/line12/chip1/port18 | 1,576,634,571.25 |
| 2 | /switch/mib102/line12/chip1/port18 | 1,534,297,271.47 |
| 3 | /switch/mc1032-isw/board0/chip1/port7 | 1,074,122,538.67 |
| 4 | /switch/mc1032-isw/board0/chip1/port15 | 1,055,855,343.27 |
| 5 | /switch/mc1032-isw/board0/chip1/port1 | 1,055,269,874.99 |

Thus, it is possible that the computational task was impacted by other computational tasks that used ports involved in the computational task used like the ports 18 and 7 mentioned in Table 1.

In another aspect, the invention relates to a method 300 for planning a computational task implemented on an interconnection network 100. This method may for example be implemented by a client 400.

As already discussed, computational tasks are typically planned by resource and task managers. Thus, the client allows the implementation of at least one task and resource manager (e.g. LSF, PBSpro, Moab, Slurm or Torque/Maui) capable of managing the implementation of a computational task on an interconnection network. The task manager can assign a unique identifier to a computational task, specify the parameters required for the computational task, optionally specify the nodes to be assigned to the computational task and memorize the nodes being used by the computational task.

As shown in FIG. 4, the planning method according to the invention generally includes a step 310 for receiving an instruction for setting up a computational task, said computational task including a list of resources required for its implementation. The resource manager is capable of receiving user computational task submissions and managing their implementation in the time and space of the interconnection network.

Then, there is an identification 320 of a subset of nodes corresponding to the list of resources required for performing the computational task, and then an initiation 330 of the computational task on the subset of identified nodes. The managers thus allow scheduling of the computational tasks so that a system can select the resources (namely nodes) to be assigned to the tasks and the launch dates. Scheduling is defined according to a policy that results in the use of scheduling algorithms and numerous criteria and parameters for guiding and framing the allocations and priorities.

When the computational task is completed, the resource manager performs an "epilogue of the computational task" during which there will be a receipt 340 of the completed computational task report. It is during this epilogue that the client can send 350 an instruction to the value acquisition device, and more particularly to the communication module 70, according to the invention, and then receive 360 one or more performance analysis reports from the values of the counters of the ports involved in the computational task.

Thus, the present invention allows to acquire, compile, store and especially visualize the various counters of an interconnection network on the ports of the equipment involved in a computational task, including the switch ports. In particular, this visualization can be done via graphs (see FIGS. 3B, 3C, 3D) that can be generated from the performance analysis reports. Advantageously, a user can easily navigate in this data set (much smaller than all the counter values of the interconnection network) and can identify, where appropriate, the source of a slowdown or deviation in these results.

In addition, the device is able to select and concentrate in a single memory or interface all the data allowing a diagnosis on a computational task. In the prior art, these diagnoses are rather at the level of the network as a whole or a subset of ports without this being related to a specific computational task.

All of these advantages therefore contribute to reducing the processing times of the performance analysis of an interconnection network as part of a computational task and also to reducing the volumes of data managed and manipulated.

The invention claimed is:

1. A device for acquiring values of counters associated with a computational task implemented on an interconnection network, said interconnection network comprising a plurality of nodes interconnected via switches, said nodes and switches including a plurality of ports associated with counters, the values of said counters being stored over time, said computational task involving a subset of ports associated with subsets of nodes and switches, and said device comprising:
A routing acquisition module adapted to acquire a routing table including all the connections of the interconnection network,
An acquisition module of involved nodes adapted to acquire a list of the nodes involved in the computational task,
A port extraction module adapted to extract a list of the ports involved in the computational task from the list of involved nodes and the routing table, and
A counter extraction module adapted to extract the values of the counters of the ports involved in the computational task from the list of ports involved and the stored values of said counters.

2. The device according to claim 1, wherein the computational task includes a start date and an end date, the counter extraction module being adapted to:
compare counter values at the start date and at the end date of the task, and
select counters the value of which has increased between the start date and the end date of the computational task.

3. The device according to claim 1, further comprising a report generation module adapted to generate at least one performance analysis report from the values of the counters of the ports involved in the computational task.

4. The device according to claim 3, wherein the report generation module is adapted to receive an instruction, said instruction including the designation of one or more counter categories, said report generation module then being adapted to generate a performance analysis report including a list of ports involved and the values of the one or more counters designated for those ports.

5. The device according to claim 3, wherein the report generation module is adapted to receive an instruction, said instruction including the designation of one or more levels of the interconnection network, said report generation module then being adapted to generate a performance analysis report regarding said one or more designated levels of the interconnection network.

6. The device according to claim 3, wherein the report generation module includes means for aggregating involved counter values, said report generation module is then adapted to generate a performance analysis report including aggregated values of the counters involved.

7. The device according to claim 1, further comprising a storage module adapted to store routing tables, lists of nodes involved in a computational task, lists of ports involved in a computational task, performance analysis reports and/or the values of the counter of the ports involved in a computational task.

8. The device according to claim 1, wherein the routing acquisition module is adapted to perform a scan of the interconnection network so as to collect the routing tables.

9. A method for planning, by a client, a computational task implemented on an interconnection network, said interconnection network including a plurality of nodes interconnected via switches, said nodes and switches including a plurality of ports associated with counters, the values of said counters being stored over time, said computational task involving a subset of ports associated with subsets of nodes and switches, said method comprising the following steps:
Receiving, by the client, an instruction for setting up a computational task, said computational task including a list of resources required to implement it,
Identifying, by the client, a subset of nodes corresponding to the list of resources required to implement the computational task,
Initiating, by the client, the computational task on the subset of identified nodes,
Receiving, by the client, the completed computational task report,
Sending, by the client, an instruction to the device for acquiring values according to claim 1, and
Receiving, by the client, one or more performance analysis reports from the values of the counters of the ports involved in the computational task provided by said device for acquiring values.

10. A method for acquiring values of counters associated with a computational task controlled by a client and implemented on an interconnection network, said interconnection network including a plurality of nodes interconnected via switches, said nodes and switches including a plurality of ports associated with counters, the values of said counters being stored over time, said computational task involving a subset of ports associated with subsets of nodes and switches, said method comprising the following steps:
Acquiring, by a routing acquisition module, a routing table including all the connections of the interconnection network,
Acquiring, by an acquisition module of involved nodes, a list of the nodes involved in the computational task, said list of involved nodes being stored on the client,
Extracting, by a port extraction module, a list of the ports involved in the computational task from the list of involved nodes and the routing table,
Extracting, by a counter extraction module, the values of the counters of the ports involved in the computational task from the list of ports involved and the stored values of said counters.

* * * * *